(12) United States Patent
De Sisti et al.

(10) Patent No.: US 9,341,934 B2
(45) Date of Patent: May 17, 2016

(54) LED LIGHT PROJECTOR WITH FRESNEL OR PLANAR-CONVEX LENS, IN PARTICULAR FOR CINEMA ILLUMINATION

(76) Inventors: Mario De Sisti, Rome (IT); Fabio De Sisti, Rome (IT); Sergio De Sisti, Rome (IT)

(*) Notice: Subject to any disclaimer, the term of this patent is extended or adjusted under 35 U.S.C. 154(b) by 197 days.

(21) Appl. No.: 14/237,554

(22) PCT Filed: Aug. 9, 2012

(86) PCT No.: PCT/IT2012/000252
§ 371 (c)(1),
(2), (4) Date: Jun. 17, 2014

(87) PCT Pub. No.: WO2013/024501
PCT Pub. Date: Feb. 21, 2013

(65) Prior Publication Data
US 2014/0320830 A1 Oct. 30, 2014

(30) Foreign Application Priority Data
Aug. 12, 2011 (IT) .............................. RM2011A0442

(51) Int. Cl.
*G03B 21/28* (2006.01)
*F21V 5/04* (2006.01)
*F21V 7/06* (2006.01)
*F21W 131/406* (2006.01)
*F21Y 101/02* (2006.01)
*F21Y 105/00* (2016.01)

(52) U.S. Cl.
CPC ................ *G03B 21/28* (2013.01); *F21V 5/045* (2013.01); *F21V 7/06* (2013.01); *F21W 2131/406* (2013.01); *F21Y 2101/02* (2013.01); *F21Y 2105/001* (2013.01)

(58) Field of Classification Search
CPC ............ G03B 21/28; F21V 7/06; F21V 5/045
See application file for complete search history.

(56) References Cited

U.S. PATENT DOCUMENTS 5,258,897 A * 11/1993 Nino .................... F21S 48/1358
362/346
2011/0007505 A1 1/2011 Wang
2011/0170289 A1 7/2011 Allen et al.

FOREIGN PATENT DOCUMENTS

CN   201203053   3/2009
CN   201246693   5/2009
(Continued)

OTHER PUBLICATIONS

International Search Report mailed on Nov. 26, 2012 for PCT/IT2012/000252 filed on Aug. 9, 2012 in the name of De Sisti, Mario et al.

(Continued)

*Primary Examiner* — David V Bruce
(74) *Attorney, Agent, or Firm* — Steinfl & Bruno LLP

(57) ABSTRACT

An optical system for LED light projectors utilizing a Fresnel or planar-convex lens that permits a considerable energy saving and an elevated quality of the illumination either in FLOOD or SPOT mode is described. The optical system has a mirror having a particular three-dimensional surface constructed by rotating a parabola and taking sectors so as to obtain a surface that is more closed than a pure parabola. A reflecting optical system for projectors utilizing a Fresnel or planar-convex lens is also described.

18 Claims, 10 Drawing Sheets

(56) References Cited

FOREIGN PATENT DOCUMENTS

| | | |
|---|---|---|
| DE | 202008011132 | 11/2008 |
| DE | 202010007032 | 8/2011 |
| WO | 2007/106411 | 9/2007 |

OTHER PUBLICATIONS

PCT International Preliminary Report on Patentability issued on Feb. 18, 2014 for PCT/IT2012/000252 filed on Aug. 9, 2012 in the name of De Sisti, Mario et al.

* cited by examiner

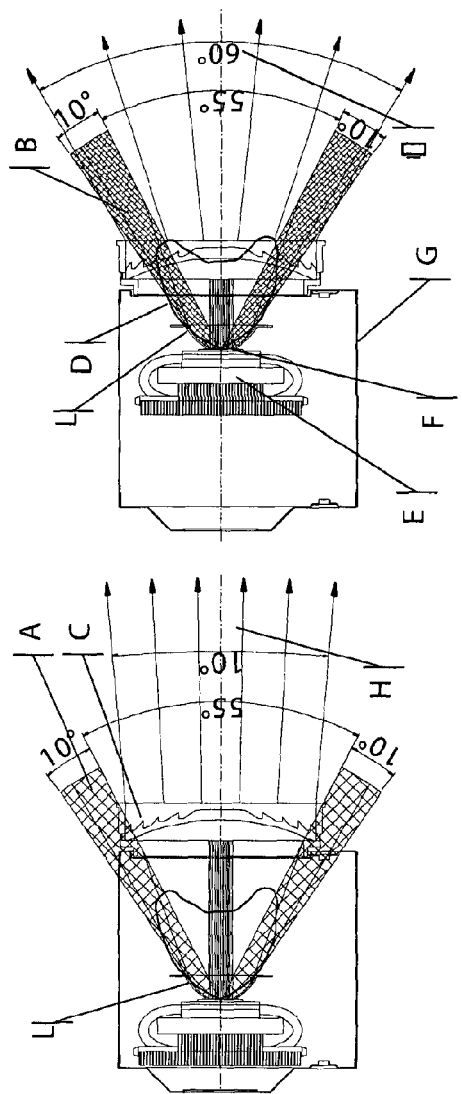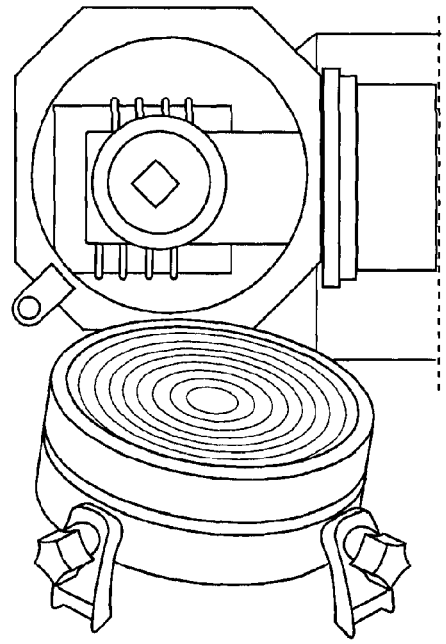
Fig. 13
Fig. 14
spot
flood (a)

(b)

(c)

LED LIGHT PROJECTOR WITH FRESNEL OR PLANAR-CONVEX LENS, IN PARTICULAR FOR CINEMA ILLUMINATION

CROSS REFERENCE TO RELATED APPLICATIONS

The present application is the US national stage of International Patent Application PCT/IT2012/00052 filed on Aug. 9, 2012 which, in turn, claims priority to Italian Patent Application RM2011A000442 filed on Aug. 12, 2011.

The present invention concerns an optical system for LED light projectors utilising a Fresnel or planar-convex lens, in particular for staging illumination.

More in particular, the present invention regards an optical system for LED light projectors utilising a Fresnel or planar-convex lens that permits a considerable energy saving and an elevated quality of the illumination either in FLOOD or SPOT mode.

As well known, the technological evolution in the sector of production of high luminous emission LEDs has brought to use these components for lighting engineering application.

In general LEDs find applications in the different sectors of the architectural and general illumination.

Moreover, they are employed in the staging illumination field and in the show field, wherein, however, to-date these components cannot satisfy all the needs.

In fact, the actual technical limit of the high luminosity LEDs is the poor luminous power available at point level, that limits its use in those optical systems that actually use point-like light sources such as filament lamps or remarkable luminous power discharge lamps.

These types of luminous sources are characterised by:
(1) elevated luminous fluxes;
(2) emission geometries of the luminous fluxes;
that make effective the optical systems themselves, mainly constituted by combinations of mirrors and lens.

Obviously, the light projectors in the professional cinema area, have to guarantee not only efficient performances, but also homogeneity characteristics, shadow production and luminous beam control that are fundamental to obtain the required results in the image production.

As well known, the Fresnel Lens, invented by the physicist Augustin-Jean Fresnel in 1827, permits the construction of optics with little focal distance without the dimensions, the thickness and the weight of the material necessary for the construction of a conventional spherical lens of equivalent dioptric power.

Such result is obtained by dividing the spherical lens in a series of annular concentric sections, named Fresnel rings. For each zone, the lens thickness is limited, transforming the continuous curve in a series of surfaces having the same curvature but being not continuous. FIG. 1 clearly shows the concept.

Making reference to FIG. 2, the projectors with Fresnel lens and the ones with planar-convex lens are surely the most used equipment in the area of the television, theatre, cinema and professional photographic illumination.

It deals with projectors that assemble a Lens (Fresnel Lens, or planar-convex Lens) and a mobile equipment constituted by a spherical mirror and a lamp arranged with its optical centre corresponding to the radius of the spherical mirror.

Changing the distance of the group spherical mirror/frontal lens lamp, on both the types of projectors, a variation of the degree of opening and luminous intensity of the emitted light beam, from "SPOT" (concentrated light cone, with beam angles typically included between 6 and 15°) to "FLOOD" (enlarged light cone, with beam angles typically included between 50 and 60°) is obtained.

Making reference to FIGS. 3 (a) and (b), the performance differences between the two types of projectors consist in that the one with Fresnel lens, contrary to the one with planar-convex lens, presents the emitted light beam in the "FLOOD" mode with softer contours; therefore, if on one hand some precision is lost, on the other hand one makes in such a way not to have sharp "breaks" between light and shadow.

From the foregoing, one can however easily appreciate the great flexibility of use and the deployment of light projectors utilising a Fresnel or planar-convex lens in the area of television, cinema, theatre and photography.

It is possible to obtain in a single object any width of luminous beam between the limit values SPOT and FLOOD, with associated variations of luminous intensity, on average of 1:8; moreover, in large beam (FLOOD) conditions it is possible to model the form of the light projected by means the lens hoods.

Starting from the aforementioned technology, the Applicant has realised and tuned a new Optical System for LED light projectors utilising a Fresnel or planar-convex lens for LED arrays or high luminosity LED systems, or also power LED (high power single LED).

In order to obtain the solution according to the invention, it has been proceeded from the following considerations.
Polar Emission—Luminous Intensity Typical for the Current Sources (Lamps):

The diagram of the polar emission of the luminous intensity of a typical filament or discharge lamp is the one shown in FIG. 4 (the values of the luminous intensity changes between the different lamp powers, but the geometry of the emission is very similar for all the single connection lamps, which are more commonly used in the Fresnel or planar-convex projectors).

The diagram shows the polar emission of the luminous intensity on the vertical plane of the lamp (on the horizontal plane the emission is homogeneous, i.e. on each angles of the polar diagram there are the same intensity values and the polar curve is a circumference with the centre collimated to the lamp centre and a radius having as value the maximum intensity of the shown diagram).

It is possible to note that the luminous intensity has maximum values on the angles 90° and −90°, while the intensity values equal to 50% of the maximum values are approximately included between 15° and 165° on the right side and between −15° and −165° on the left side (tot. 300° beam angle).

In principle it is possible to state that on the vertical plane the angular emission within the 50% of the maximum pick of the luminous intensity, typical for a single-connection lamp, is of 150° for 2 times, therefore 300°, whilst on the horizontal plane is of 360°.

Taking into consideration that the projectors utilising a Fresnel or planar-convex lens are characterised by a symmetric optics, it is useful to geometrically analyse, on the only vertical plane, which portions of the complex luminous energy emitted by the conventional lamps are effectively "exploited" (used) by the optical system itself and therefore which sectors are "wasted" inside the projector housing.

In FIG. 5 the luminous energy portions are represented which used in the positions SPOT and FLOOD, these positions being the limits (lens focuses) of the luminous beam tuning range. The distance of the two lens focuses is characterised by the lens itself, by its dimensions and by the principle—optical design on the basis of which it has been realised.

In FIG. 5 the letters indicate:
A: Angular sectors of the luminous intensity dispersed inside the projector in SPOT mode,
  On the emission vertical plane of the lamp:
   Total Vertical Emission within the 50% of the maximum intensity=(43°×2+65°)×2=302°;
   Used Vertical Emission=(65°×2)=130°;
   Dispersed Vertical Emission=(43°×4)=172°;
  and on the emission horizontal plane of lamp:
   Total Horizontal Emission=360°;
   Used Horizontal Emission=(65°×2)=130°;
   Dispersed Horizontal Emission=360°−(65°×2)=230°;
B: Angular sectors of the luminous intensity dispersed inside the projector in FLOOD mode,
  On the emission vertical plane of the lamp:
   Total Vertical Emission within the 50% of the maximum intensity=(11°×2+129°)×2=302°;
   Used Vertical Emission=(129°×2)=258°;
   Dispersed Vertical Emission=(11°×4)=44°;
  and on the emission horizontal plane of lamp:
   Total Horizontal Emission=360°;
   Used Horizontal Emission=(129°×2)=258°;
   Dispersed Horizontal Emission=360°−(129°×2)=102°;
C: Fresnel Lens;
D: Polar Diagram (vertical plane) of the luminous intensity, for a typical Filament or Discharge Lamp;
E: Spherical mirror;
F: Single connection lamp (it can be a filament or discharge lamp);
G: Projector housing with —carrying ring;
H: Luminous Intensity Emission typical of the Fresnel projector in SPOT mode (Beam Angle—comprises the luminous intensity values between 100% and 50%);
I: Luminous Intensity Emission typical of the projector Fresnel in FLOOD mode (Beam Angle—comprises the luminous intensity values between 100% and 50%).

Considerations on the State-of-Art of the Fresnel Lens Applied on Conventional Filament and Discharge Lamps From the mentioned FIG. 5, it is evident that a great part of the luminous energy is lost inside the projector utilising a Fresnel or planar-convex lens.

If for the users the Fresnel or planar-convex optics are particularly appreciated, because they offer a great flexibility of application (tuning of the amplitude and therefore the luminous intensity of the light beam at SPOT or FLOOD, modelling of the light beam form at FLOOD by means the lens hoods, and with evident parameters of visual quality of the projected light beams), from the point of view of the yields the typical system, associated to the existing and more commonly used lamps (both filament and discharge lamps) has limited parameters, since a great part of the luminous energy produced by the lamps themselves is dispersed inside the projector.

Substantially, referring to the only lamp emission that, by means of the internal optics of the Fresnel lens projector, concentrates on the internal surface of the lens itself, in general it is possible to affirm that:

at SPOT 43% (130°:302° on the vertical plane and 36%) (130°:360° on the horizontal plane of the luminous intensity emitted by the lamp is utilised: the average is therefore a yield of 39.5%;

at FLOOD 85% (258°:302° on the vertical plane and 71.6%) (258°:360° on the horizontal plane of the luminous intensity emitted by the lamp is utilised: the average is therefore a yield of 76.3%.

The aforementioned values have been expressed in geometric terms and referring to the only yield of the internal optical system of the projector in relation to the polar emission of the lamp intensity, since other yields are not quantifiable in general terms but they should be analysed on specific optical systems.

Use of LEDS in Projectors Utilising a Fresnel or Planar-Convex Lens

The technological evolution in the area of high luminosity LED has made available LED arrays or power LEDs with characteristics of luminous and colorimetric emission that begin to be interesting for the theatre, cinema, television and photograph illumination fields.

An example of LED array is given in FIG. 6, but it has to be understood that the present invention equally works well with the so called Power LED, that rather add the fact of approximating a point luminous source.

The luminous fluxes actually emitted by said components types, together with the geometries of the polar diagrams of the luminous intensity emissions that characterised them, make possible to use them on optical systems using Fresnel or planar-convex-lens.

A number of producers of projectors for the illumination have started product lines that use exactly LED arrays as light sources.

Prior Art in the Projectors Using LED Fresnel or Planar-Convex Lens

Polar Emission of Luminous Intensity Typical for a LED Array

The diagram of the polar emission of the luminous intensity of the high luminosity LED array showed in the previous figure, is reported in FIG. 7.

FIG. 7 shows the polar emission of the luminous intensity on a plane, but the emission is homogeneous over all the planes of the polar diagram.

It is noted that the luminous intensity has maximum values on the 90° angle, while on the contrary the intensity values equal to the 50% of the maximum values are in the range between 30° and 150° of the right side.

The angular emission within the 50% of the maximum pick of the luminous intensity typical of the analysed LED array type, results therefore to be of 120° (on all the planes that form the round angle).

Analysis of the Known Optical System Using Fresnel Lens with LED:

Many manufacturers still use LED matrix as light source inside the Fresnel optics, simply assembling the LED matrix instead of the conventional lamp and avoiding the use of the mirror, since the polar emission of the LED itself is the one previously described.

Due to the symmetry of the light cone emitted by the Fresnel or planar-convex lens projectors, we geometrically analyse only one plane in order to quantify which portions of the complete luminous energy emitted by a LED matrix are actually "exploited" (used) by the same optical system and therefore which sectors are "wasted" inside the projector housing.

In FIG. 8, the portions of the luminous energy there are respectively represented, which are used in the SPOT and FLOOD, which are the extremes (focus) of the luminous beam adjusting range.

The letters in the figure indicate:
A: Angular sectors of the luminous intensity dispersed within the projector at SPOT:
  Total Emission=120°
  Used Emission=52°
  Dispersed Emission=120°−52°=68°
B: Angular sectors of the luminous intensity dispersed within the projector at FLOOD, Total Emission=120°
Used Emission=84°
Dispersed Emission=120°−84°=36°
C: Fresnel Lens
D: Polar Diagram of the luminous intensity, for a high typical luminosity LED array;
E: Cooling System of the LED array;
F: high luminosity LED array;
G: Projector housing with lens-carrying ring;
H: Luminous Intensity of typical emission of the Fresnel projector at SPOT (Beam Angle comprising the values of luminous intensity between 100% and 50%);
I: Luminous Intensity of emission typical of the Fresnel projector at FLOOD (Beam Angle comprising the values of luminous intensity between 100% and 50%).

Considerations on the State-of-Art of the LED Fresnel Lens Projectors:

Making a purely geometric comparison between the conventional lamps and the LED matrix at high luminosity, it results evident from a percentage point of view of the luminous energy emitted by the sources themselves, that in the Fresnel optics (or planar-convex optics), using the known technique for the conventional lamps and the one as much known for the LED Matrix, very similar results are obtained in terms of yield.

In fact, from the FIG. 8 it is evident that:
at SPOT 43%)(52°:120° of the luminous intensity emitted by the LED array is used (to be compared to the average 39.5% in the case of the conventional lamps solution);
at FLOOD 70%)(84°:120° of the luminous intensity emitted by the LED array is used (to be compared to the average 76.3% in the case of the conventional lamps solution).

It has to be observed that the analysis has been carried out in analogy to the one previously performed for the same projector that however uses conventional filament or discharge lamps. In other terms, it is geometrically referred to the only yield of the internal optical system of the projector related to the polar emission of the LED array intensity, since other yields are not quantifiable in general terms, but it should be analysed on specific optical systems. Nevertheless, it comes out to be useful the fact of being able to compare homogeneous data taken on the same objects (same projector, same lens, same focal distances), simply substituting the source.

The considerations at yields level are therefore equal, but in terms of final performances big differences of luminous fluxes are found between the conventional lamps and the LED.

To have a practical comparison on a Fresnel lens projector between the performances of a classic filament source and a LED array, the sources in the FIG. 9 have been respectively used on the same Fresnel lens projector, obviously equipped by a spherical mirror in the case of a filament lamp and of a LED array with a dissipation system in the other case (according to the schemes showed in the previous figures).

The following table shows the measured data in the same test conditions.

|  | Fresnel Projector (120 mm) with filament lamp of 500 W | Fresnel Projector (120 mm) with LED array of 41 W |
| --- | --- | --- |
| Illuminance at 3 m at SPOT | 3.135 Lux (28.215 Candles) | 1.825 Lux (16.425 Candles) |
| Illuminance at 3 m at FLOOD | 452 Lux (4.068 Candles) | 175 Lux (1.575 Candles) |

The other performances are valid in both cases, i.e. the homogeneity of the emitted light and the suitable functioning of the lens hood to model the projected beam in FLOOD mode.

It has to be consider that the use of these projectors is predominantly from half focalisation to all FLOOD, therefore the important difference of performance on the light emission between the two types of sources is to be evidenced on the FLOOD value.

In the previous chapters, the yield of the only emission of the LED matrix used as light motor for the Fresnel lens has been geometrically analysed, observing the luminous energy portions "wasted" inside the projector wrapping housing, both in the SPOT and in the FLOOD positions.

One derives from the above-mentioned analysis and from the comparison made using the same Fresnel lens, both with an internal optics at LED array and with a filament/spherical mirror lamp group, that the difference of luminous fluxes between the two sources doesn't allow the LED solution to obtain the final photometric performances comparable to the filament conventional solution, if the yield of the optical system remains similar to the two solutions.

It is to be remarked that the comparison between the two light sources used in the analysis, in terms of energetic consumptions is:

| Filament lamp 500 W Ratio about 1:12 | LED Matrix 41 W |
| --- | --- |

But from a photometric point of view (for comparison between the two cases, we can analyse the FLOOD position since it is more significant from the point of view of the consumers for the product selection) the difference of the values is remarkable:
Central illuminance value (Lux) at 3 meters of distance, FLOOD position (large beam).

| Filament lamp 452 Lux Ratio about 1:2.58 | LED array 175 Lux |
| --- | --- |

These Data confirm what actually occurs in the reference market.

The different manufacturers of illumination products have to use LED arrays of very high power (for example 150-200 W) with respect to the one used for the comparison in this document (41 W), in order to offer products equivalent to the actual most popular filament projectors.

It is evident that this introduces a series of problems whose solutions come out to be expensive and relatively "less reliable" with respect to an optical system with higher yield of the devices (for example in the high luminosity LED, the careful managing the LED cooling is essential to maintain constant the luminous emission, to stabilise the chromatic characteristics and guarantee the life of the LED itself), in addition the higher used power weaken the impact of the energetic saving that really could be reached with an optimized optics (in the hypothesis of use of a LED array of 150 W to substitute a Fresnel projector with a filament lamp of 500 W there is a ratio of 1:3.33 instead of a ratio of 1:12 that one would obtain using a LED array of 41 W).

All that has determined a particular attention to develop an optical system suitably conceived and developed to exploit at the maximum the luminous emission of high luminosity LEDs in focalisable Fresnel or at planar-convex lens, projectors.

Object of the present invention is to provide an optical system with high yield for the use of LED in Fresnel or planar-convex lens illumination projectors, that solves the problems and overcomes the drawbacks of the prior art.

It is further specific object an illumination projector that uses the optical system of the invention, that solves the problems and overcomes the drawbacks of the prior art.

It is subject-matter of the present invention a projector LED light projector, in particular for cinema illumination, comprising luminous source, a Fresnel or planar-convex lens having an optical axis, a mirror including a three-dimensional surface starting from a plane that is perpendicular to said optical axis and whereon said source is placed, the projector being characterised in that said three-dimensional surface is obtained by starting from a starting parabola having a vertex, a focus, a curvature and an axis coinciding with said optical axis, and by:

rotating the axis of said starting parabola by an angle $\alpha<45°$ with respect to focus (F), obtaining a rotated parabola;

defining a new optical axis passing through the vertex of the rotated parabola and parallel to the axis of the starting parabola;

taking a sector of an angle $\beta \leq 90°$ of the rotated parabola profile starting from an axis passing through said focus and perpendicular to said new optical axis, and proceeding towards the vertex of the rotated parabola;

rotating said sector by an angle $\gamma$ around said new optical axis.

Preferably according to the invention, said angle $\alpha$ is comprised in the range 10 to 20°.

Preferably according to the invention, said angle $\alpha$ is comprised in the range 14 to 16°, in particular is equal to 15°.

Preferably according to the invention, said angle $\gamma$ is equal to 360°.

Preferably according to the invention, said angle $\beta$ is comprised in the range 45 to 75°.

Preferably according to the invention, said angle $\beta$ is comprised in the range 55 to 65°, in particular is equal to 60°.

Preferably according to the invention, said mirror has an overall surface obtained by said surface obtained theoretically with $\beta=90°$ and taking out a portion around its vertex which finds itself on said new optical axis, in such a way that the luminous source can be positioned within the so defined hole.

Preferably according to the invention, said luminous source is a LED source.

Preferably according to the invention, said luminous source is an end of a waveguide connected by means of one or more waveguide ramifications ending on the other side on as much luminous sources far away from said mirror, in such a way to collect their produced light.

Preferably according to the invention, said light source is a Lambertian source.

It is further independent subject-matter of the present invention a reflecting optical system for LED light projectors utilising a Fresnel or planar-convex lens, in particular for cinema illumination, the system including a three-dimensional surface starting from a plane that is perpendicular to said optical axis and whereon said source is placed, the projector being characterised in that said three-dimensional surface is obtained by starting from a starting parabola having a vertex, a focus, a curvature and an axis coinciding with said optical axis, and by:

rotating the axis of said starting parabola by an angle $\alpha<45°$ with respect to focus (F), obtaining a rotated parabola;

defining a new optical axis passing through the vertex of the rotated parabola and parallel to the axis of the starting parabola;

taking a sector of an angle $\beta \leq 90°$ of the rotated parabola profile starting from an axis passing through said focus and perpendicular to said new optical axis, and proceeding towards the vertex of the rotated parabola;

rotating said sector by an angle $\gamma$ around said new optical axis.

Preferably according to the invention, said angle $\alpha$ is comprised in the range 14° to 16°, in particular is equal to 15°.

Preferably according to the invention, said angle $\gamma$ is equal to 360°.

Preferably according to the invention, said angle $\beta$ is comprised in the range 55 to 65°, in particular is equal to 60°.

The present invention will be now described as illustrative, but not limitative, according to its specific embodiments, with particular reference to the figures of the enclosed drawings, in which:

FIG. 1 schematically shows in (a) the transversal section and a frontal view of a positive Fresnel lens and in (b) the transversal section and a frontal view of a standard planar-convex lens having the same dioptric power;

FIG. 2 schematically shows a projector according to the prior art;

FIGS. 3 (a) and 3 (b) show simulations of the light beam projection on a screen respectively with projector having a FLOOD planar-convex lens and projector having a FLOOD Fresnel lens, according to the prior art;

Figure 1:
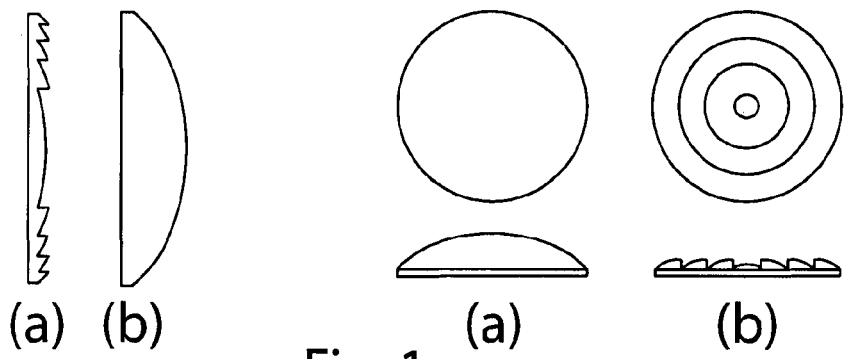
Figure 2:
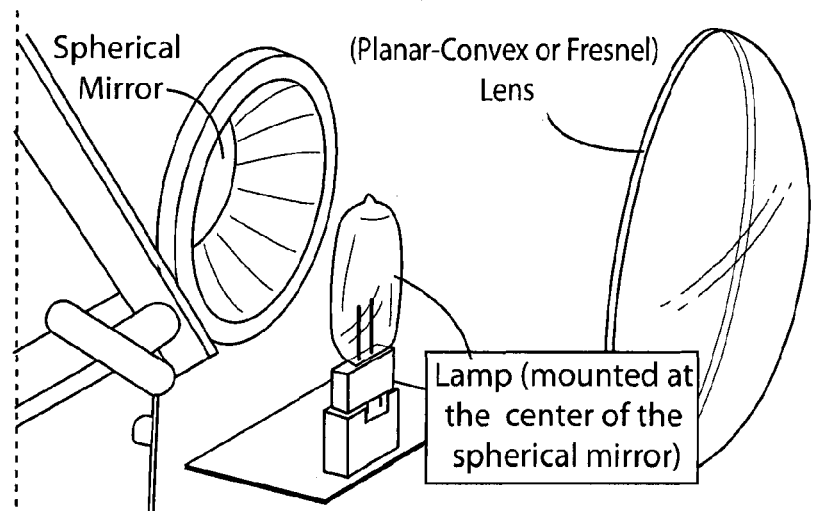
Figure 3:
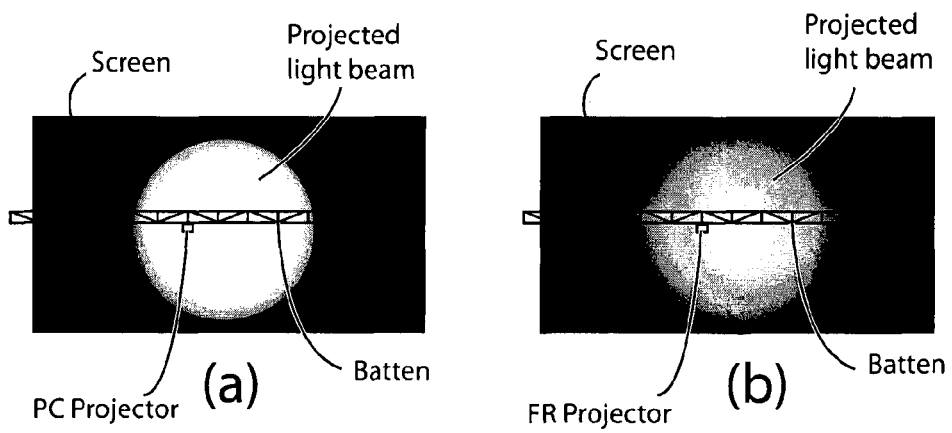
Figure 4:
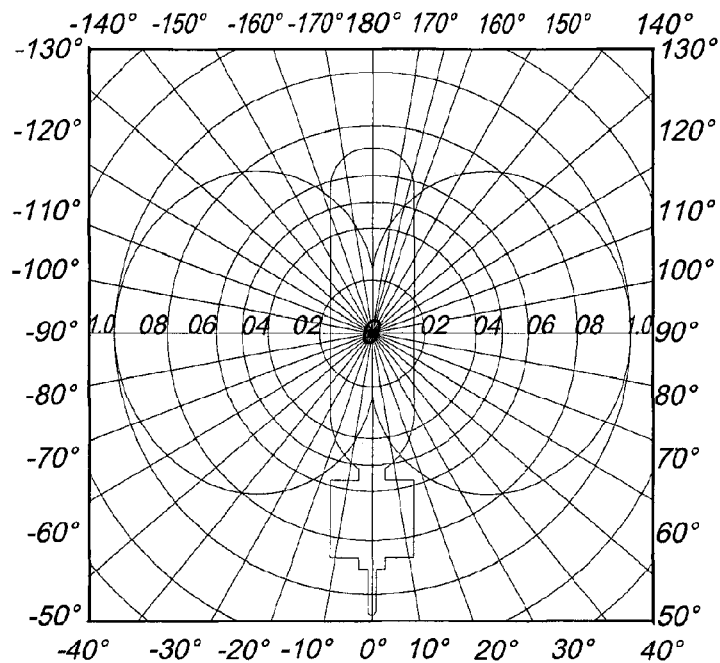
FIG. 4 shows a polar diagram of the luminous intensity of a tungsten halogen quartz lamp with con GY9,5 base, according to the prior art.
Figure 5:
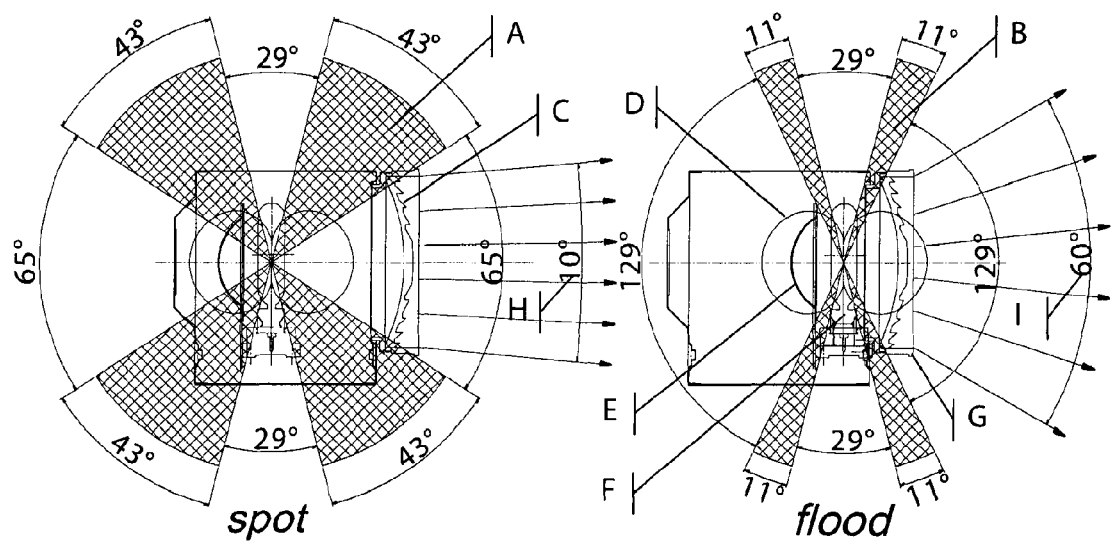
FIG. 5 shows a typical diagram with the angular sectors of the luminous energy emitted by a filament or a discharge lamp used by the Fresnel optics, according to the prior art.
Figure 6:
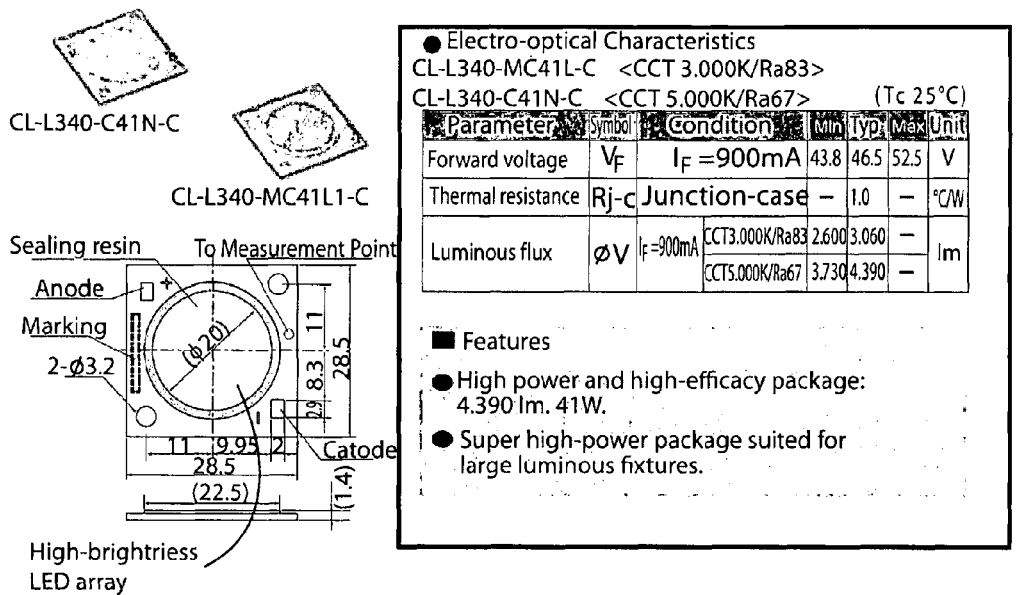
Figure 7:
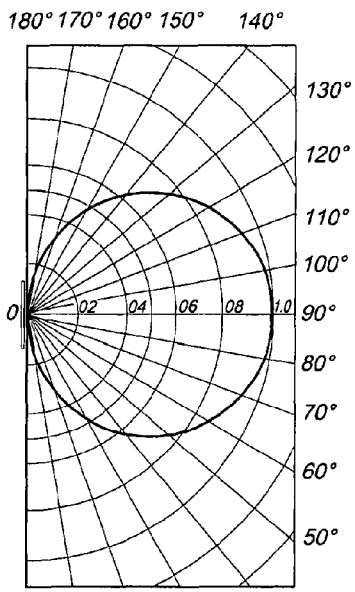
Figure 8:
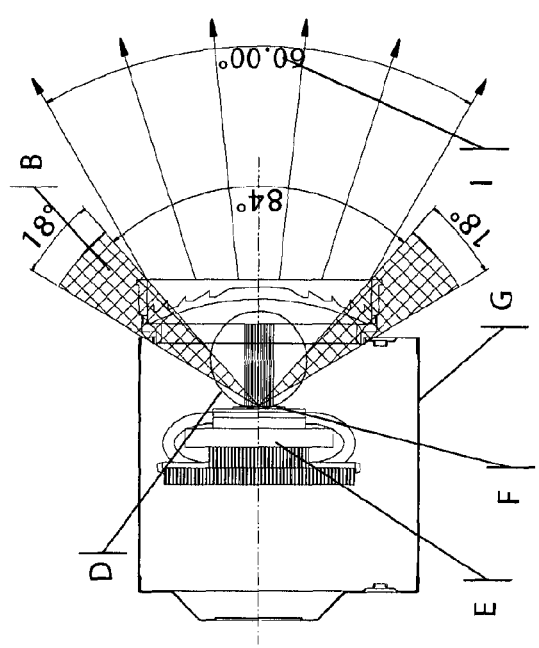
Figure 8:
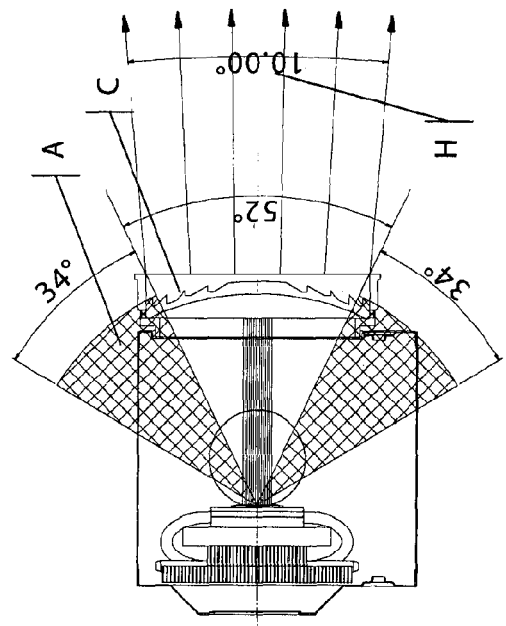
Figure 9:
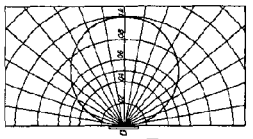
Figure 9:
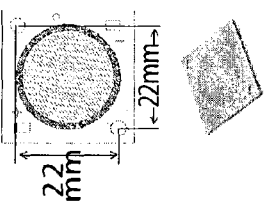
Figure 9:
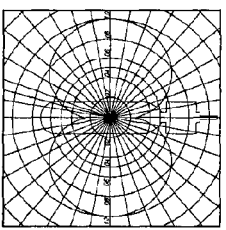
Figure 9:
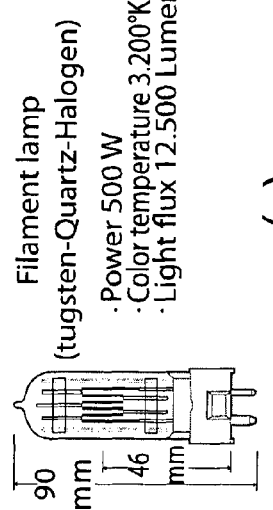
Figure 10:
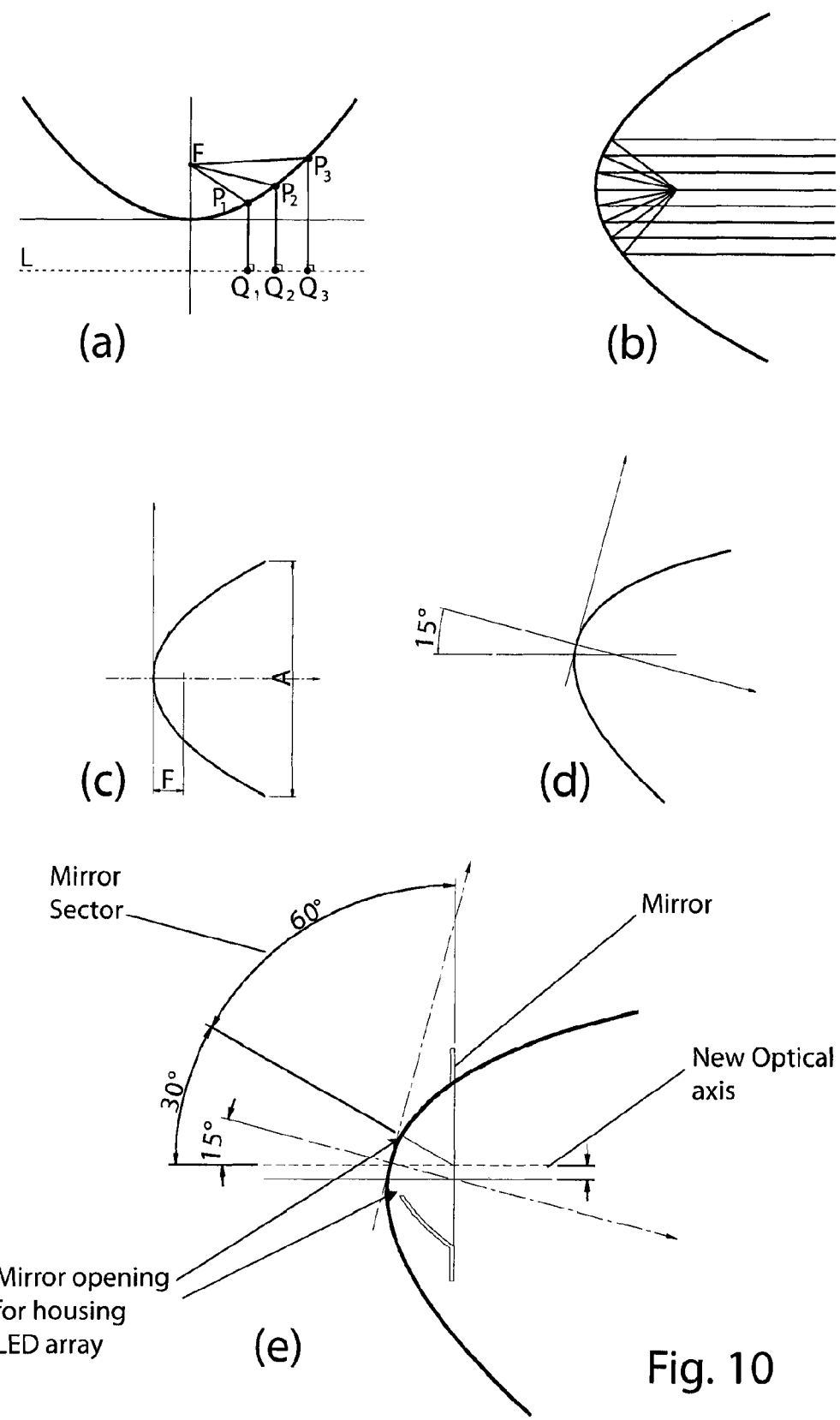
Figure 11:
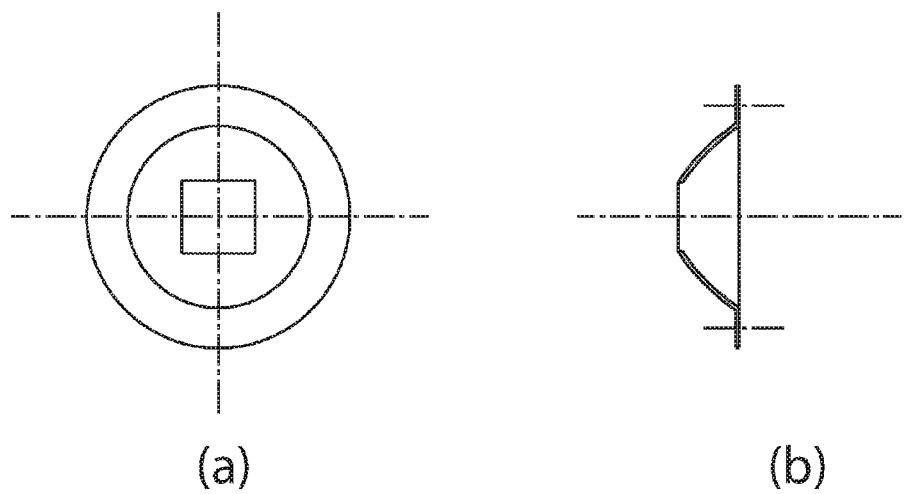
Figure 12:
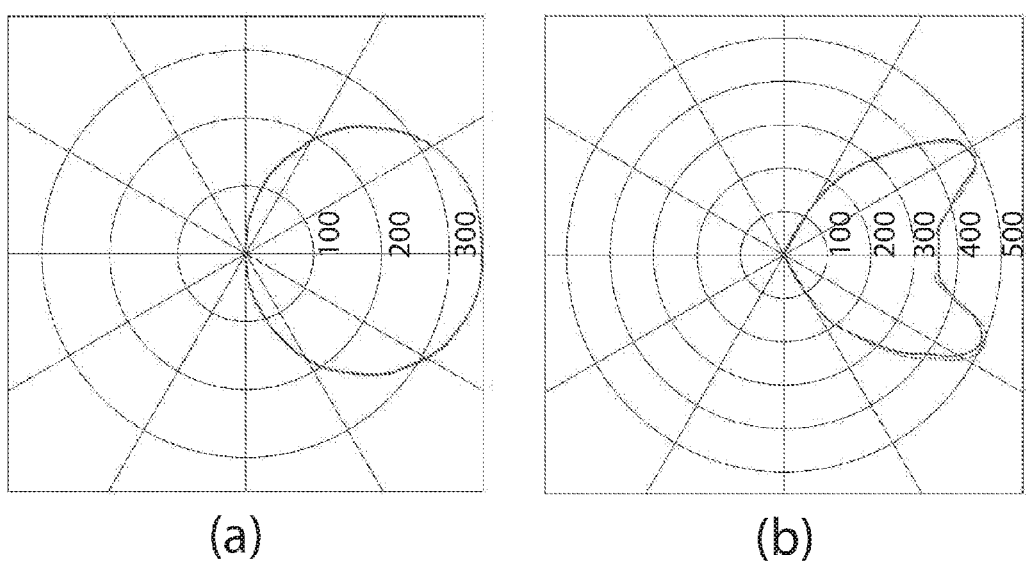
Figure 15:
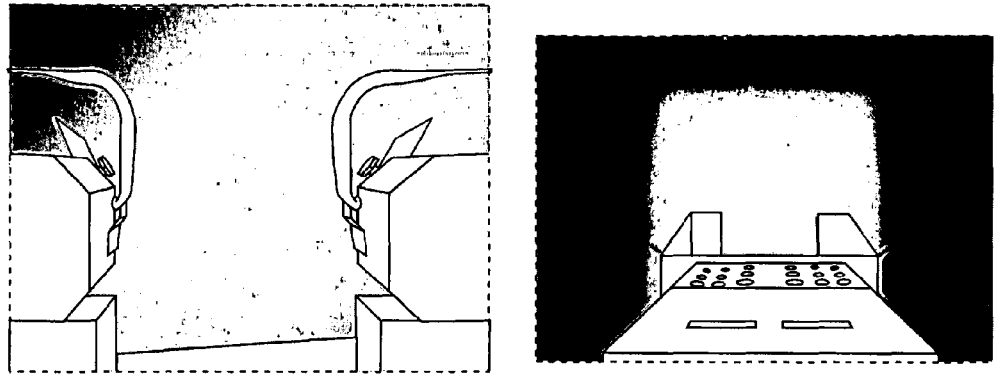
Figure 16:
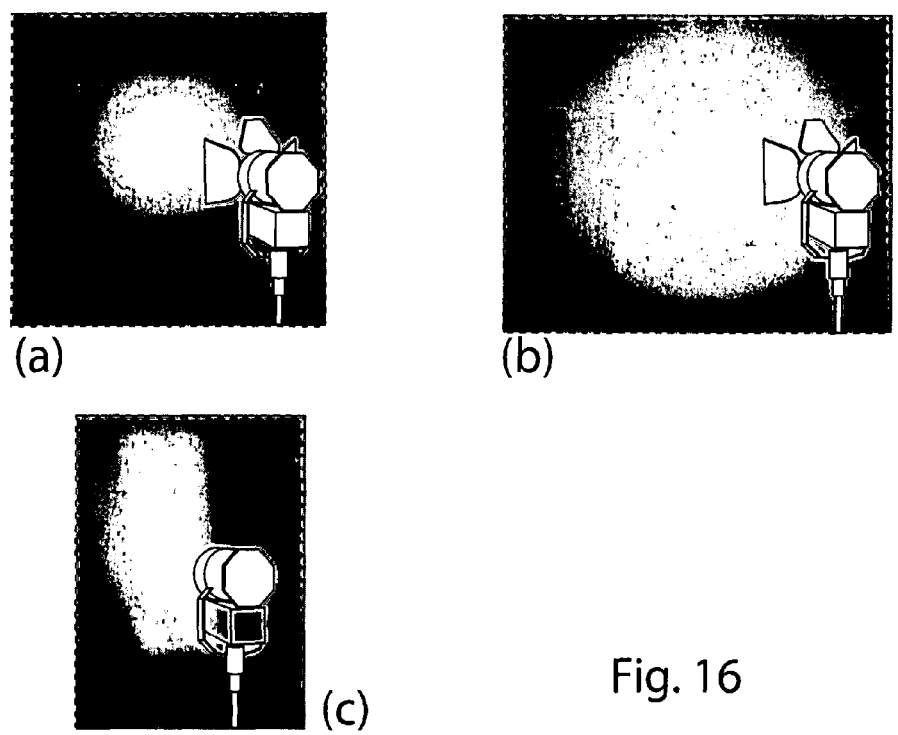
Figure 17:
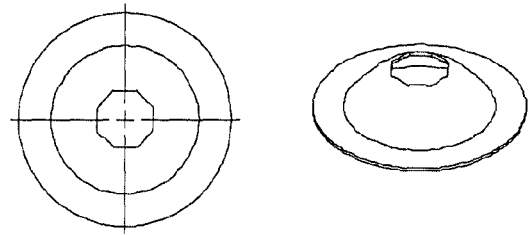
Figure 17:
Figure 17:
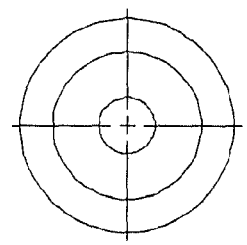
Figure 17:
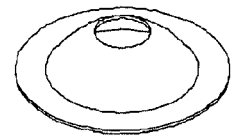
Figure 17:
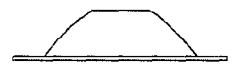
Figure 17:
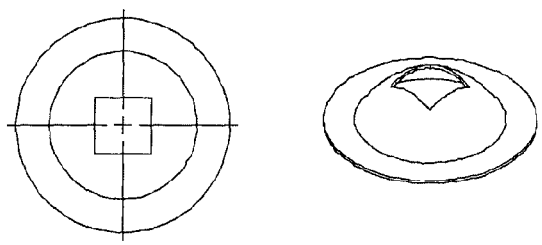
Figure 17:
Figure 18:
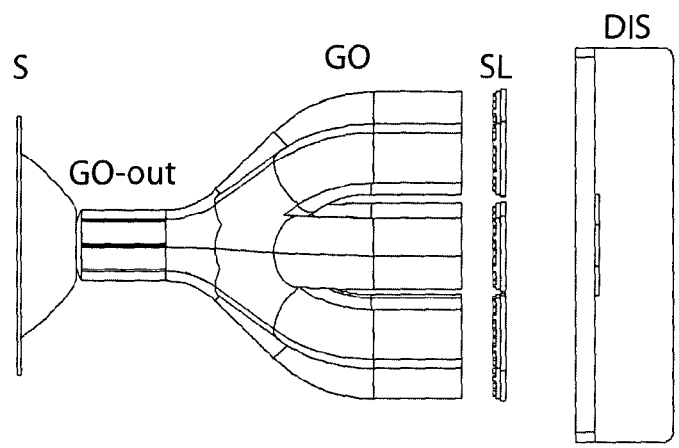
Figure 19:
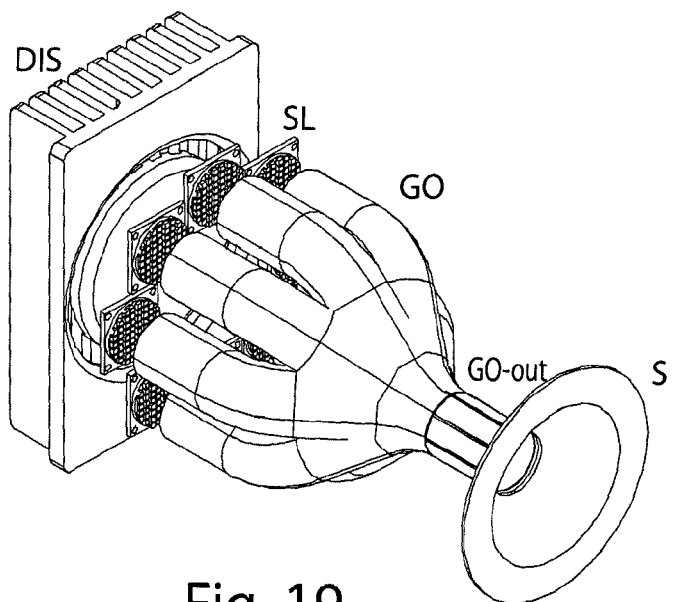

FIG. 6 schematically shows a LED array system, according to the prior art;

FIG. 7 shows a polar diagram of the luminous intensity of a LED array, according to the prior art;

FIG. 8 shows angular sectors of the luminous energy emitted by a LED array used by the Fresnel optics, according to the prior art;

FIGS. 9 (a) e (b) show respectively the polar diagrams of the luminous intensity of a 500 w filament lamp and of a 41 w LED array used for a comparative photometric analysis of the same projector;

FIGS. 10 (a)-(e) show the steps for the building of the reflective optics according to the invention;

FIG. 11 shows the reflective optics according to the invention in frontal (a) and lateral (b) views;

FIG. 12 shows the comparison of the polar diagrams of the luminous intensity between the only LED array and the same array provided with the optics according to the invention;

FIG. 13 shows the angular sectors of the luminous energy used by the Fresnel optics, generated by a LED array with the high yield optics according to the invention;

FIG. 14 shows a photographic reproduction of the optics according to the invention mounted in combination with a LED array on a Fresnel lens projector;

FIG. 15 shows the control of the effect with the lens hoods on the form of the beam projected by Fresnel at FLOOD;

FIG. 16 shows a Fresnel with the optical system according to the invention: projections starting from left at SPOT, at FLOOD and at FLOOD with the cut of the lens hoods;

FIG. 17 shows three different forms of mirrors according to the invention, derived starting from a same basic form and making a hole around the vertex of the surface in substantial correspondence with the parabola focus;

FIG. 18 shows a sectional view of a further embodiment of the present invention, wherein one creates a source of a quasi-point-like type starting from several sources far away from each other, the point-like source being then placed in the proximity of the focus of the mirror according to the invention;

FIG. 19 shows a perspective view of the embodiment of FIG. 18.

The Applicant, to solve the problems of the above mentioned prior art, has conducted some experimentations to identify which component of a projector should have been the innovation object. These experimentations have been considered starting from the polar graphs of the above mentioned luminance.

Following a long period of experimentation and simulation, we have pursued 2 methods for pondering the polar emission form of the LED motor to what is needed at the inlet of the Fresnel or the planar-convex lens, without luminous energy loss:
1. lens addiction in front of the LED matrix
2. mirrors addiction to the LED matrix The first method has been soon abandoned since, against the suitable geometric modelling of the luminous emission at the lens entrance (inlet), the attenuation of the values of the luminous intensity introduced by the lens itself doesn't guarantee evident increases in the total performances of the complete projector.

On the contrary results progressively remarkable have been obtained utilising complementary mirrors assembled together with the LED array, until the reaching of the claimed innovation.

In the step preceding the reaching of the innovative solution for the mirror dedicated exactly to the high photometric yield in the Fresnel and in the LED planar-convex projectors, a huge quantity of preventive checks have been realised, at level of graphic and balance simulations, with tests and practical measurements, to verify the possible use of mirrors with known forms (spherical, elliptic, parabolic), without however obtaining very important results or equivalent to the ones produced then by the invention.

Clearly, the particular form of the LED matrix and their polar emission of the luminous intensity, not only are comparable to the point-like sources (filament and discharge single-connection lamps) previously used, therefore the design approach at level of mirrors and lens has required deep afterthoughts or modifications respect to the prior art.

In particular the innovation introduced by the dedicated mirror to the LED array for the optimised functioning of the Fresnel or planar-convex lens (i.e. the content of the present document is applicable to any combination of Led array or to big dimension LED, combinable to a Fresnel or planar-convex lens, respecting the suitable ratio of form and lens dimensions, LED array and Innovative Optics) consists in having modelled in an ideal manner the polar emission of the luminous intensity for the suitable functioning of lens of this type.

Theoretical Building of the Mirror

The scheme of the FIG. 10 (a) shows the geometrical construction of a parabola (known geometric form). Making the hypothesis of having a mirror with sectional profile coinciding with the parabola and an ideal point-like light source placed on the focus of said known geometrical form, the light rays reflected by the parabolic mirror will be parallel to the optical axis, as indicated in the FIG. 10 (b).

Nevertheless, the high luminosity LED arrays, or the single LED of high power, are not point-like sources and have no polar emissions in all the directions.

Therefore, with the objective to finalise a reflection system that will act on peripheral zones of the polar diagram of the luminous intensity typical of the LED arrays, we have assembled a particular form of the mirror, that has origins derived from the parabola form.

In particular, the dislocation of the luminous source, that is not a point anymore, but a surface, corresponding to the net dimensions of the LED array, had to be suitably the bottom of the reflecting form to be devised.

Making reference to the FIG. 10 (c), it has been considered the profile of a parabola having focus F and opening A, and it has been rotated the parabola profile of 15° with respect to the optical axis (FIG. 10 (d)) and to the focus point. Therefore, it has been defined a new optical axis (the simple dotted line in figure), parallel to the parabola axis before the rotation and crossing the rotated parabola vertex. The mirror object of the innovation is obtained taking the sector of 60° of the rotated parabola profile, measured from the centre constituted by the intersection of the new optical axis (dotted line in FIGS. 10 (d) and (e)) with the vertical projection of the original parabola focus.

This segment is then rotated of 360° around the new optical axis to have the form of the second mirror of the invention.

The form of the mirror is simply scaled as a function of the dimensions of the emitting surfaces of the used LED arrays, in relation to the dimensions of the Fresnel or planar-convex lens. The concept is therefore applicable to different dimensions and LED powers and lens of the mentioned type.

In FIG. 11 two views of the so obtained mirror are reported.

In such a way, the two segments comes out to be more open with respect to the ones of the prior art and balance the disadvantages of a multidie LED source.

In FIG. 12, the polar diagram of the luminous intensity of the 41 W LED array (Colour Temperature 3.000° K and Luminous Flux 3.060 Lumen) previously used is shown, for the comparison with a filament source, as well as the polar diagram of the same array equipped of the optics subject-matter of the innovation.

In FIG. 12 (a), the Polar Diagram of the Luminous Intensity of the CITIZEN sample LED array is shown. In FIG. 12 (b) the Polar Diagram of the Luminous Intensity of the CITIZEN sample LED array with optics according to the invention is shown.

The values of the luminous intensity given on the two diagrams are expressed in Candles: 1000 lumen. Therefore, in order to obtain the effective candles value in a point of the graph, the value of the point itself has to be multiplied by the result of the ratio of the Luminous Flux of the LED array under examination (3.060): 1000=3.06. For example, if we wish to know the value of the luminous intensity over the axis 90° of both graphs, it will be for the diagram (a) (Led array 41 W standard): 348×3.06=1.064.88 candles on the axis 90°; and for the diagram (b) (Led array 41 W with innovative optics) 356×3.06=1.089.36 candles on the axis 90°.

The fundamental aspect that is obtained is the shrinking of the polar emission of the light motor weighted over the dimensions of the acceptance surface of the Fresnel or the planar-convex lens.

In fact the only LED array, as previously noted, has a polar emission form of the luminous intensity that determines some angular sectors completely unused by the Fresnel or planar-convex optics, on the contrary the innovative optical system modifies the polar emission of the luminous intensity in a functional way with respect to requirements of the Fresnel or planar-convex lens, re-focusing, according to the acceptance angle of the lens itself, all the luminous energy that otherwise would be dispersed.

FIG. 17 shows three different forms of mirrors according to the invention, derived starting from a same basic form and making a hole around the vertex of the surface in substantial correspondence to the parabola focus. Indeed, the above-discussed embodiment is not the only one. The form of the mirror is defined in the above described way without however taking a sector of 60° of the rotated parabola profile, taking instead the whole sector of 90° and rotating it around the new optical axis. From this theoretical construction, a portion is then taken away in correspondence to the vertex on the new optical axis, to create the seat for the luminous source. Or no portion is taken away and one puts the source simply in correspondence of the focus on the new optical axis. Obviously, the light source can also be slightly displaced from the focus, obtaining equally interesting results.

FIG. 18 shows a sectional view of a further embodiment of the present invention, wherein one creates a source of a quasi-point-like type (end of the GO-out segment) starting from several sources SL far away from each other, the point-like source being then placed in the proximity of the focus of the mirror according to the invention. This happens tank to waveguides GO carrying the light from the remote sources SL in an only region Go-out, for example circular. With the reference DIS, one indicates the heat dissipator needed for example in the case of LED sources.

FIG. 19 shows a perspective view of the embodiment of FIG. 18. This embodiment thus approximates the light source in correspondence of said focus to a point-like source, with all the ensuing advantages.

Fresnel Projector with Lens of 120 Mm Diameter: Comparison of Photometric Performances Between the Use of 500 W Filament Lamp, 41 W LED Array (Prior Art) and 41 W LED Array with Optics (Innovation) in the Same Projector.

We repeat the comparison of the photometric performances using the different light motors inside of the projector itself and therefore of the same Fresnel lens, the measured results are reported in the following table:

|  | Fresnel Projector (120 mm.) with Filament Lamp of 500 W | Fresnel Projector (120 mm.) with LED array of 41 W | Fresnel Projector (120 mm.) with LED array of 41 W with optics according to the invention |
|---|---|---|---|
| Illumination at 3 m. in SPOT | 3.135 Lux (28.215 Candles) | 1.825 Lux (16.425 Candles) | 2.160 Lux (19.440 Candles) |
| Illumination at 3 m. in FLOOD | 452 Lux (4.068 Candles) | 175 Lux (1.575 Candles) | 320 Lux (2.880 Candles) |

It can be noted the substantial change of the staging values produced with the use of the mirror system with high yield, especially in the FLOOD conditions, wherein the contribution of the optics subject-matter of the innovation is such to cause the augmentation of the emission of 1.83 times the one of the only LED array, maintaining the homogeneity and control characteristics (FLOOD lens hoods effect) over the emitted light beam. This makes the examined product "comparable" to a filament projector that consumes 12 times more.

The angular sectors of the luminous energy used by the Fresnel optics, generated by a LED matrix with the high yield optics according to the invention are shown in FIG. 13. In FIG. 13, the letters represent:

A: Angular sectors of the luminous intensity dispersed inside the projector at SPOT:
Total Emission=75°
Used Emission=55°
Dispersed Emission=75°−55°=20°

B: Peripheral angular sectors of the luminous intensity for the reinforcement of the luminous beam extremes at FLOOD. Thanks to the emission obtained with the innovative optics, there are no angular sectors of LED array luminous intensity missed in the projector in FLOOD position; rather, the particular geometry of the polar emission of the luminous intensity gives bigger energy in the lens peripheral sectors, so as to augment the homogeneity effect of the luminous beam emitted by the projector.

C: Fresnel Lens;

D: Polar Diagram of the luminous intensity, obtained with the innovative optics added to the typical LED array;

E: Cooling System of the LED array;

F: LED array at high luminosity;

G: Projector housing with lens-carrying ring;

H: Luminous Intensity Emission Typical of the Fresnel projector at SPOT (Beam Angle comprising the values of luminous intensity between 100% and 50%);

I: Luminous Intensity Emission Typical of the Fresnel projector at FLOOD (Beam Angle comprising the values of luminous intensity between 100% and 50%).

L: optical system with mirror at high efficiency to optimise the polar emission of the LED luminous intensity and make it ideal for the functioning in combination with a Fresnel or planar-convex lens optics.

With geometric reference to what previously described for the only LED array at high luminosity and to what obtained with the innovation results, a substantial increase of the yields is found, as shown in the following table:

|  | FRESNEL LENS PROJECTOR WITH CONVENTIONAL LED ARRAY | FRESNEL LENS PROJECTOR WITH LED ARRAY AND INNOVATIVE OPTICS |
|---|---|---|
| % of the Angular Luminous Intensity Emission used in SPOT | 43% (52°:120°) | 73% (55°:75°) |
| % of the Angular Luminous Intensity Emission used in FLOOD | 70% (84°:120°) | 100% (75°:75°) |

In FIG. 14 there is a photographic reproduction of the optics according to the invention assembled in combination with a LED array on a Fresnel lens projector.

In FIG. 15 the effect of the control by the lens hoods on the form of the beam projected by the Fresnel (LED Daylight array with CCT 5.600° K and with CCT 3.000° K array, respectively at left and at right side, are used) is shown. The perfect cut of the hoods avoids white zones, that would have appeared if the cut would have been not precise and if the two beams would have overlapped themselves.

In FIG. 16 a Fresnel with innovative optical system is shown: projections starting from left at SPOT, at FLOOD and at FLOOD with lens hoods cut.

In the foregoing, the preferred embodiments have been described and some variations of the present invention have been suggested, but, it is to be understood that those skilled in the art could make modifications and variations without departing from the relative scope of the invention, as defined by the enclosed claims.

The invention claimed is:

1. A light projector comprising a luminous source, a Fresnel or planar-convex lens having an optical axis, a mirror including a three-dimensional surface starting from a plane that is perpendicular to said optical axis and whereon said source is placed,
wherein said three-dimensional surface is obtained by starting from a starting parabola having a vertex, a focus, a curvature and an axis coinciding with said optical axis, and by:
rotating the axis of said starting parabola by an angle $\alpha < 45°$ with respect to the focus, thereby obtaining a rotated parabola;
defining a new optical axis passing through the vertex of the rotated parabola and parallel to the axis of the starting parabola;
taking a sector of an angle $\beta \leq 90°$ of the rotated parabola profile starting from an axis passing through said focus and perpendicular to said new optical axis, and proceeding towards the vertex of the rotated parabola; and
rotating said sector by an angle $\gamma$ around said new optical axis.

2. The projector of claim 1, wherein said angle $\alpha$ is comprised in the range 10° to 20°.

3. The projector of claim 1, wherein said angle $\alpha$ is comprised in the range 14° to 16°.

4. The projector of claim 1, wherein said angle $\alpha$ is equal to 15°.

5. The projector of claim 1, wherein said angle $\gamma$ is equal to 360°.

6. The projector of claim 1, wherein said angle $\beta$ is comprised in the range 45° to 75°.

7. The projector of claim 1, wherein said angle $\beta$ is comprised in the range 55° to 65°.

8. The projector of claim 1, wherein said angle $\beta$ is equal to 60°.

9. The projector of claim 1, wherein said mirror has an overall surface obtained by said surface obtained theoretically with $\beta = 90°$ and taking out a portion around the vertex of said mirror which finds itself on said new optical axis, in such a way that the luminous source can be positioned within a defined hole.

10. The projector of claim 1, wherein said luminous source is a LED source.

11. The projector of claim 1, wherein said luminous source is an end of a waveguide connected by means of one or more waveguide ramifications ending on the other side on corresponding luminous sources far away from said mirror, in such a way to collect produced light from the luminous sources.

12. The projector of claim 1, wherein said light source is a Lambertian source.

13. A reflecting optical system for light projectors utilising a Fresnel or planar-convex lens, in particular for cinema illumination, the system including a three-dimensional surface starting from a plane that is perpendicular to said optical axis and whereon said source is placed,
wherein said three-dimensional surface is obtained by starting from a starting parabola having a vertex, a focus, a curvature and an axis coinciding with said optical axis, and by:
rotating the axis of said starting parabola by an angle $\alpha < 45°$ with respect to the focus, thereby obtaining a rotated parabola;
defining a new optical axis passing through the vertex of the rotated parabola and parallel to the axis of the starting parabola;
taking a sector of an angle $\beta \leq 90°$ of the rotated parabola profile starting from an axis passing through said focus and perpendicular to said new optical axis, and proceeding towards the vertex of the rotated parabola; and
rotating said sector by an angle $\gamma$ around said new optical axis.

14. The system of claim 13, wherein said angle $\alpha$ is comprised in the range 14° to 16°.

15. The system of claim 13, wherein said angle $\alpha$ is equal to 15°.

16. The system of claim 13, wherein said angle $\gamma$ is equal to 360°.

17. The system of claim 13, wherein said angle $\beta$ is comprised in the range 55° to 65°.

18. The system of claim 13, wherein said angle $\beta$ is equal to 60°.

* * * * *